(12) United States Patent
Bauer et al.

(10) Patent No.: US 9,543,776 B2
(45) Date of Patent: Jan. 10, 2017

(54) CHARGING/DISCHARGING CIRCUIT FOR ELECTRO ACTIVE POLYMER BASED VARIABLE CAPACITOR

(71) Applicant: SINGLE BUOY MOORINGS INC., Marly (CH)

(72) Inventors: Pavol Bauer, Delft (NL); Todor Todorcevic, Delft (NL)

(73) Assignee: SINGLE BUOY MOORINGS INC., Marly (CH)

(*) Notice: Subject to any disclaimer, the term of this patent is extended or adjusted under 35 U.S.C. 154(b) by 133 days.

(21) Appl. No.: 14/399,657

(22) PCT Filed: May 7, 2013

(86) PCT No.: PCT/EP2013/059468
§ 371 (c)(1),
(2) Date: Nov. 7, 2014

(87) PCT Pub. No.: WO2013/167579
PCT Pub. Date: Nov. 14, 2013

(65) Prior Publication Data
US 2015/0102780 A1    Apr. 16, 2015

(51) Int. Cl.
*H02J 7/00* (2006.01)
*H02M 3/158* (2006.01)
(Continued)

(52) U.S. Cl.
CPC .............. *H02J 7/007* (2013.01); *H02M 3/158* (2013.01); *H02M 2001/0048* (2013.01); *H02N 2/181* (2013.01)

(58) Field of Classification Search
CPC  H02J 7/007; H02M 3/158; H02M 2001/0048; H02N 2/181
See application file for complete search history.

(56) References Cited

U.S. PATENT DOCUMENTS 6,628,040 B2 *  9/2003  Pelrine .................... F02G 1/043
                                                      310/307
6,936,994 B1 *  8/2005  Gimlan ................... B60L 8/003
                                                      320/101
(Continued)

FOREIGN PATENT DOCUMENTS

DE      44 35 832       4/1996
JP      2008 141840     6/2008
WO      2010/146457     12/2010

OTHER PUBLICATIONS

International Search Report dated Sep. 20, 2013, corresponding to PCT/EP2013/059468.

(Continued)

*Primary Examiner* — Naum B Levin
(74) *Attorney, Agent, or Firm* — Young & Thompson

(57) ABSTRACT

Electronic device (1) for charging and discharging a capacitor (10) from and to a power source (30). The electronic device is connectable to the capacitor and to the power source, and includes a first circuit (SI, D, R1, LI) for charging the capacitor and at least one second circuit (S2, D, R2, L2) for discharging the capacitor. The capacitor is connected to the first circuit in a charge line (31) and is connected to the second circuit in a discharge line (32). Both the charge line and discharge line are connectable to the power source. The first circuit is arranged as a first buck converter circuit and the at least one second circuit is arranged as a second buck converter circuit.

12 Claims, 5 Drawing Sheets

(51) Int. Cl.
*H02N 2/18* (2006.01)
*H02M 1/00* (2006.01)

(56) References Cited

U.S. PATENT DOCUMENTS

| | | | | |
|---|---|---|---|---|
| 7,557,456 | B2* | 7/2009 | Kornbluh | F03B 13/1845 |
| | | | | 290/42 |
| 7,977,923 | B2* | 7/2011 | Pelrine | H02N 2/181 |
| | | | | 320/166 |
| 9,231,473 | B2* | 1/2016 | Van Kessel | F03B 13/14 |
| 2001/0035723 | A1 | 11/2001 | Pelrine et al. | |
| 2007/0108956 | A1* | 5/2007 | Steigerwald | H01F 6/006 |
| | | | | 323/288 |
| 2007/0257490 | A1 | 11/2007 | Kornbluh et al. | |
| 2008/0218132 | A1* | 9/2008 | Pelrine | H02N 11/002 |
| | | | | 322/2 A |
| 2014/0145550 | A1* | 5/2014 | Hitchcock | H01L 41/113 |
| | | | | 310/300 |
| 2014/0247624 | A1* | 9/2014 | Anderson | H02M 3/335 |
| | | | | 363/15 |
| 2015/0076962 | A1* | 3/2015 | Van Kessel | H02N 1/08 |
| | | | | 310/300 |

OTHER PUBLICATIONS

Ray Ridley; "The Nine Most Useful Power Topologies"; Oct. 1, 2007; pp. 15-18.

* cited by examiner

CHARGING/DISCHARGING CIRCUIT FOR ELECTRO ACTIVE POLYMER BASED VARIABLE CAPACITOR

FIELD OF THE INVENTION

The present invention relates to a circuit for electromechanical energy conversion. Also, the present invention relates to an electromechanical energy conversion system comprising such a circuit.

BACKGROUND ART

Harvesting energy from a electromechanical energy conversion system energy converter using Dielectric Elastomer (DE), as sort of Electro Active Polymer (EAP), requests for special way of charging and discharging the DE. Such an electromechanical energy conversion system using an EAP based device is for example disclosed in WO2010/146457, embodied as a wave energy converter.

Such an EAP based device can be considered as a variable capacitor of which the capacitance changes as a function of the amount of deformation exerted on a layer of EAP material.

As so far, some types of converters are built and tested. Usually they are boost step-up (for charging) and buck step-down (for discharging) converters. Because of electrical and conversion losses that occur special attention is paid to current shape during charging and discharging.

For discharging of the variable capacitor of the EAP based device at the moment it is contracted, buck (generally step-down) converters are used. A main reason is that the power sink/source, for example a battery, has lower voltage than the variable capacitor in the contracted state of the EAP based device.

A way of choosing a right topology for buck conversion in discharging function comes from different conditions. It is desirable to have buck conversion with low voltage switches, easy control of current, small inductor, low switching frequency, small losses and, of course, to keep the topology simple as much as possible in terms of hardware structure and control.

From the aspect of energy harvesting it is important to keep losses relatively small. Conversion losses will be minimal if an optimal way of charging and discharging is used, and this includes control of the current shape during charging and discharging of the variable capacitor of the EAP based device. Electrical losses will occur if there is a lot of current ripple, but avoiding this means that converter should work in CCM (Continuous Conduction Mode) and then switching losses will be increased because a higher switching frequency must be achieved. New SiC semiconductors, for example, have lower switching losses, so they seems to be reasonable choice for use in step-up converters and step-down converters.

Additionally, high current amplitudes are expected to produce higher electric losses due to the high series resistance of the EAP material. On the other hand, allowing only relatively low current amplitudes adversely affect the conversion efficiency by increase of the charging time of the EAP based device before a maximum electric field in the EAP based device is reached, which leads to higher conversion losses.

It is an object of the present invention to provide a charging/discharging circuit for an electromechanical energy conversion system and an electromechanical energy conversion system that overcomes the disadvantages from the prior art.

SUMMARY OF THE INVENTION

To achieve the object, the present invention provides an electronic device as defined in claim 1.

The object is achieved by an electronic device for charging and discharging a capacitor from and to a power source, the electronic device connectable to the capacitor and to the power source, and comprising a first circuit for charging the capacitor and at least one second circuit for discharging the capacitor; the capacitor being connected to the first circuit in a charge line and being connected to the second circuit in a discharge line, both the charge line and discharge line connectable to the power source, wherein the first circuit is arranged as a first buck converter circuit and the at least one second circuit is arranged as a second buck converter circuit.

According to an aspect there is provided an electronic device as described above, wherein the first buck converter circuit comprises a first switch, a first inductor and a first diode, the second buck converter circuit comprises a second switch, a second inductor and a second diode;
a positive terminal of the power source is connectable to a positive electrode of the capacitor along the charge line which in a series connects the first switch and the first inductor of the first buck converter circuit to the positive terminal of the capacitor with the first inductor arranged adjacent the positive electrode of the capacitor;
the positive terminal of the power source is connectable to the positive electrode of the capacitor along the discharge line which in a series connects the second switch and the second inductor of the second buck converter circuit to the positive terminal of the capacitor with the second inductor arranged adjacent the positive terminal of the power source, and
the voltage of the power source being rated between a minimal and maximal voltage of the capacitor as obtainable during use.

According to an aspect there is provided an electronic device as described above, further comprising a common level conductor to which the negative terminal of the power source and the negative electrode of the capacitor are connectable.

According to an aspect there is provided an electronic device as described above, wherein the first and second diode are embodied as a common diode, the common diode being connected between a first node of the charge line and the common level conductor; the first node of the charge line being between the first switch and the first inductor.

According to an aspect there is provided an electronic device as described above, wherein the first node of the charge line is connected to a second node of the discharge line between the second switch and the second inductor.

According to an aspect there is provided an electronic device as described above, wherein the charge line comprises a first control diode between the first node and the first inductor, the first control diode having a forward direction towards the first inductor, and
the discharge line comprises a second control diode between the second node and the second inductor, the second control diode having a forward direction towards the second inductor.

According to an aspect there is provided an electronic device as described above, wherein the first diode of the first buck converter is connected between a first node of the charge line and the common level conductor; the first node of the charge line being between the first switch and the first inductor; the first diode having a forward direction towards the charge line, and the second diode of the second buck converter is connected between a second node of the discharge line and the common level conductor; the second node of the discharge line being between the second switch and the second inductor; the second diode having a forward direction towards the discharge line.

According to an aspect there is provided an electronic device as described above, wherein the electronic device comprises the first buck converter circuits and a plurality of second buck converter circuits;

wherein the first buck converter circuit is arranged in a charge line connectable between a positive terminal of the power source and a positive electrode of the capacitor and each of the plurality of second buck converter circuits is arranged in a respective discharge line connectable between a positive terminal of the power source and a positive electrode of the capacitor, wherein a discharge period for each pair of the plurality of the second buck converter circuits in adjacent discharge lines is shifted over a constant phase difference, the voltage of the power source being rated between a minimal and maximal voltage of the capacitor as obtainable during use.

According to an aspect there is provided an electronic device as described above wherein the first buck converter circuit comprises a first switch, a first inductor and a first diode, each of the plurality of second buck converter circuits comprises a respective second switch, a respective second inductor and a respective second diode;

the charge line in a series connecting the first switch and the first inductor of the first buck converter circuit to the positive terminal of the capacitor with the first inductor arranged adjacent the positive electrode of the capacitor;

each discharge line in a series connecting the respective second switch and the respective second inductor of the respective second buck converter circuit from the plurality of second buck converter circuits to the positive terminal of the capacitor with the respective second inductor arranged adjacent the positive terminal of the power source, and the first diode of the first buck converter being connected between a first node of the charge line and the common level conductor, the first node of the charge line being between the first switch and the first inductor; the first diode having a forward direction towards the charge line, and the respective second diode of each second buck converter being connected between a second node of the respective discharge line and the common level conductor; the second node of the respective discharge line being between the second switch and the second inductor of the respective second buck converter circuit; the respective second diode having a forward direction towards the discharge line.

According to an aspect there is provided an electronic device as described above, wherein the capacitor is a variable capacitor.

According to an aspect there is provided an electronic device as described above wherein the common level conductor is a ground level connector.

According to an aspect there is provided an electromechanical energy conversion system comprising a variable capacitor, an electronic device and a power source;

the power source being coupled to the electronic device; the electronic device being coupled to the variable capacitor; the variable capacitor comprising first and second electrodes that are separated by an intermediate medium providing a gap distance between the first and second electrodes;

the gap distance of the variable capacitor being adjustable between a minimal distance and a maximal distance as a function of an externally applied mechanical force;

the electronic device unit being arranged for charging the variable capacitor from the power source at substantially a state of the variable capacitor when the gap distance is minimal and for discharging the variable capacitor to the power source at substantially a state of the variable capacitor when the gap distance is maximal and/or the area of the variable capacitor is maximal, wherein the electronic device comprises a first circuit for charging the capacitor and at least one second circuit for discharging the capacitor; the capacitor being connected to the first circuit in a charge line in-between the power source and the variable capacitor and being connected to the at least one second circuit in a discharge line in-between the variable capacitor and the power source, wherein the first circuit is arranged as a first buck converter circuit and the at least one second circuit is arranged as a second buck converter circuit.

According to an aspect there is provided a method for electromechanical energy conversion using an electromechanical system as described above comprising the step of selecting a DC voltage of the power source between a minimal and a maximal voltage of the capacitor as obtainable during use.

BRIEF DESCRIPTION OF DRAWINGS

The invention will be explained in more detail below with reference to drawings in which illustrative embodiments thereof are shown. The drawings are intended exclusively for illustrative purposes and not to restrict the inventive concept, which is defined by the claims.

In the following figures, the same reference numerals refer to similar or identical components in each of the figures.

DETAILED DESCRIPTION OF EMBODIMENTS

Figure 1:
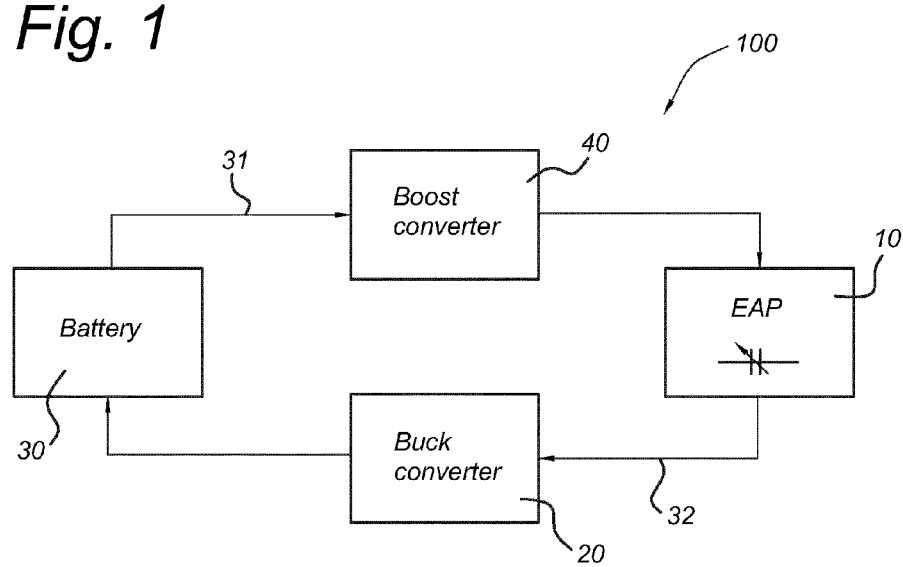
FIG. 1 shows schematically a prior art active EAP energy conversion system.

FIG. 1 shows schematically a prior art active EAP based energy conversion system 100. Such an active EAP based energy conversion system 100 comprises an EAP based device that acts as a variable capacitor 10, a step-down converter 20, a power sink/source 30 and a step-up converter 40.

The EAP based device is typically an elastically deformable body comprising a layer of stretchable synthetic material of Electro Active Polymers (EAP). Upon charging the EAP material electrically, the EAP material acts as a capacitor. By deforming the body, the layer of EAP material changes its dimensions, which changes the capacitance of the EAP material layer. Therefore the layer of EAP material can act as a variable capacitor as a function of its state of elastic deformation.

The power source is connected to the variable capacitor by means of the step-up converter 40 in such a way that upon stretching the layer of EAP material the EAP material layer is charged electrically by the step-up converter.

Further the variable capacitor 10 is connected to the power source 30 by means of the step-down converter which is arranged to discharge the variable capacitor 10 during release or relaxation of the stretched EAP material layer, i.e., during relaxation the elastically deformable body returns to a lower (or even zero) elastic deformation in comparison to the stretched state.

The power source is arranged to act as source of electric charge during the charging operation and to act as sink of electric charge during discharge. According to prior art, the step-up converter is typically a boost converter and the step down converter is typically a buck converter.

Figure 2:
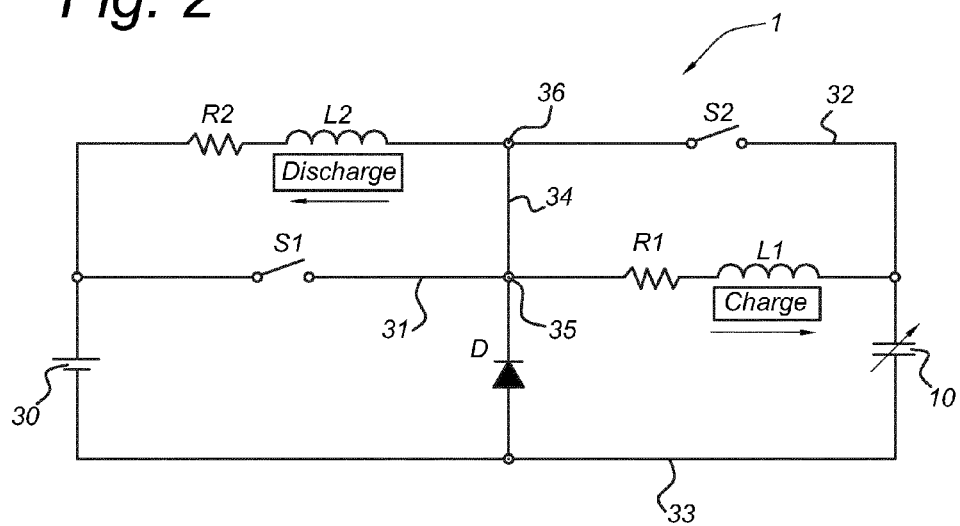
FIG. 2 shows schematically a topology of an electronic device according to an embodiment of the invention.

FIG. 2 shows schematically a topology of an electronic device 1 according to an embodiment of the invention. According to the invention, a relatively simple method for energy harvesting is considered.

The voltage $U_{EAP}$ of the EAP based variable capacitor will change as a function of the strain of the EAP material as explained above. The DC voltage $U_{BAT}$ is selected between the minimum and maximum obtainable EAP voltage. By easily charging the variable capacitor from $U_{BAT}$ to $U_{EAP}$ and then after relaxation with increased voltage discharging it to $U_{BAT}$ again, with control of the flowing current, it is recognized that energy can be harvested by adapting the charging/discharging circuit.

According to the invention, the step-up converter and step-down converter are combined in a single circuit that comprises arrangement of two buck converters L1, S1, D1, R1; L2, S2, D2, R2 wherein the diodes D1, D2 are embodied by one diode D in common to the two buck converters.

A positive terminal of the power source 30 is connected to the positive electrode of the variable capacitor 10 along a charge line 31 which in a series connects a first switch S1 (typically a transistor), and a first inductor L1 to the positive terminal of the variable capacitor 10. The first inductor L1 has an internal resistance schematically indicated by first resistor R1.

Further, the positive terminal of the power source 30 is connected to the positive electrode of the variable capacitor 10 along a discharge line 32 which in a series connects a second inductor L2 and a second switch S2 (typically a transistor) to the positive terminal of the variable capacitor 10. The second inductor L2 has an internal resistance schematically indicated by second resistor R2.

The charge line 31 is parallel to the discharge line 32.

Additionally, the negative terminal of the power source 30 is connected to the negative electrode of the variable capacitor 10 by a common line 33.

The common line 33 is connected to the charge line 31 by the common diode D arranged between the common line 33 and the charge line 31 with the forward direction of the common diode D towards the charge line 31. The common diode D connects at node 35 on the charge line between the first switch and the first inductor L1 (with internal resistor R1).

Further, the charge line 31 and the discharge line 32 are connected by connection 34 between the node 35 in the charge line 3l and a second node 36 in the discharge line 32, wherein the second node is between the second switch S2 and the second inductor L2 (with second internal resistor R2).

So, basically, by using the electronic device according to FIG. 2, the power source may charge the variable capacitor 10 along the charge line 31 when the voltage $U_{EAP}$ on the variable capacitor 10 is smaller than the voltage $U_{BAT}$ of the power source 30. When the voltage $U_{EAP}$ on the variable capacitor 10 is larger than the voltage $U_{BAT}$ of the power source 30, the variable capacitor 10 may discharge and return charge to the power source.

Figure 3A:
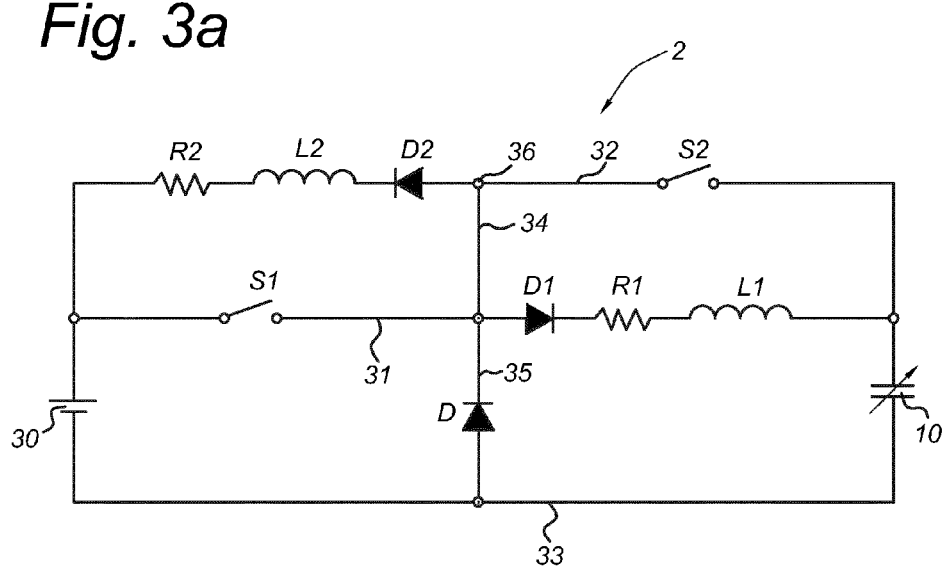
FIGS. 3a-3c show schematically a topology of an electronic device according to an embodiment of the invention.
Figure 3B:
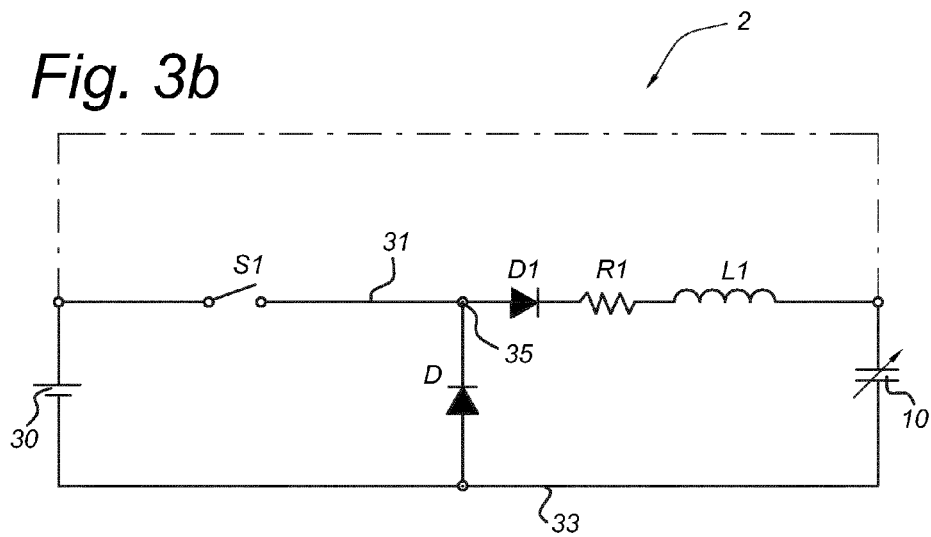
Figure 3C:
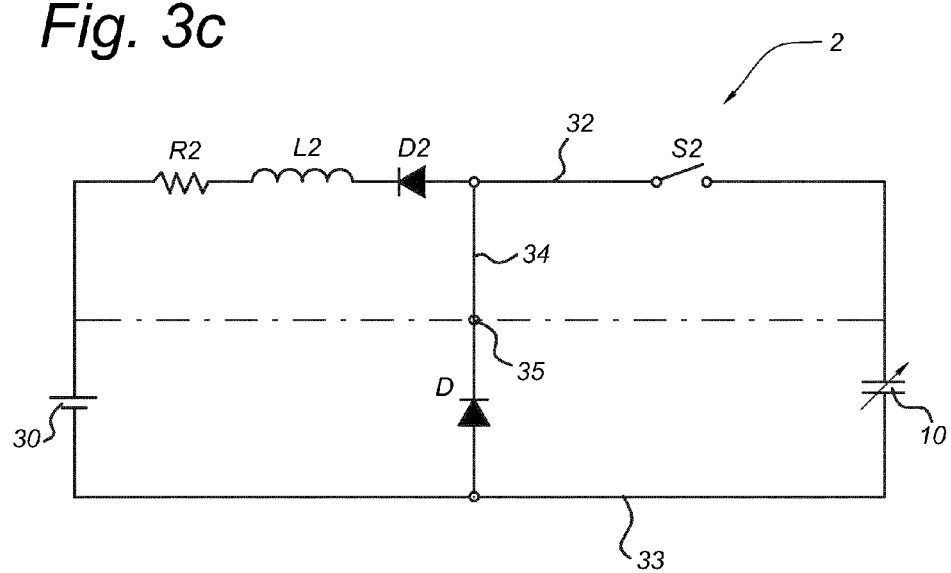

FIGS. 3a-3c show schematically a topology of an electronic device 2 according to an embodiment of the invention.

Modification of the electronic device 1 shown in FIG. 2 is done so full control of the current can be achieved. As shown in FIG. 3a, in comparison with embodiment shown in FIG. 2, two diodes are added. A first control diode D1 is added in the charge line 31 between node 35 and the first inductor L1. A second control diode D2 is added in the discharge line 32 between the second node 36 and the second inductor L2.

As shown in FIG. 3b, the buck converter S1, L1, R1 in the charge line 31 is used for charging the variable capacitor 10 (the discharge line greyed out), with a current flowing in the forward direction of the first control diode D1.

As shown in FIG. 3c, the buck converter S2, L2, R2 in the discharge line 32 is used for discharging (the charge line greyed out) with current flowing in the forward direction of the second control diode D2.

Second control diode D2 allows current flow only through first switch S1 and not through second inductor L2 in parallel during charging of EAP. In the same way, the first control diode D1 allows current flow only through second switch S2 and not through first inductor L1 in parallel during discharging.

Using the schematic circuit shown in FIG. 3a, a simulation model is developed using ideal switches S1, S2 and a switching frequency of 4 kHz. The model shows that during discharge the EAP variable capacitor 10 is on the source-side of the buck converter and experiences a high currentripple, which leads to higher losses. The model includes 4 mH (very high because switching frequency is low) first and second inductors with 10 mΩ series resistance, $U_{BAT}$ source of 4000 V, and the EAP material layer modeled as variable capacitor, whose capacitance is changing with stretching from 18 mF to 58 mF. EAP's dimensions and constants are length L=200 m, width W=50 m, permeability=20, maximum electric field strength of 100 MV/m, thickness of the electrodes of 0.1 μm, thickness of the film 100 μm and series resistance of 1.1429Ω. Stretch changing frequency is 0.5 Hz constant during simulation. Pre-stretch ratio of the EAP is 1.4 and amplitude of deformation is 0.4. It is observed that the current shape is not perfect and because of high ripple has higher value in peak than desirable ideal current. A maximum reached voltage $U_{EAP}$ is 10 kV. An energy gain of 360 kJ per cycle is calculated for these settings.

The electronic device 2 according to the embodiment of FIG. 3a-3c can also be used in constant field operation during stretching and relaxation.

Using a constant electric field operation will provide a higher energy gain, but this type of operation requires higher $U_{BAT}$ voltage because the maximum electric field must be reached.

In the model a higher value of $U_{BAT}=6500V$ is required for this type of operation. The calculated energy gain increases to 520 kJ per cycle.

Figure 4:
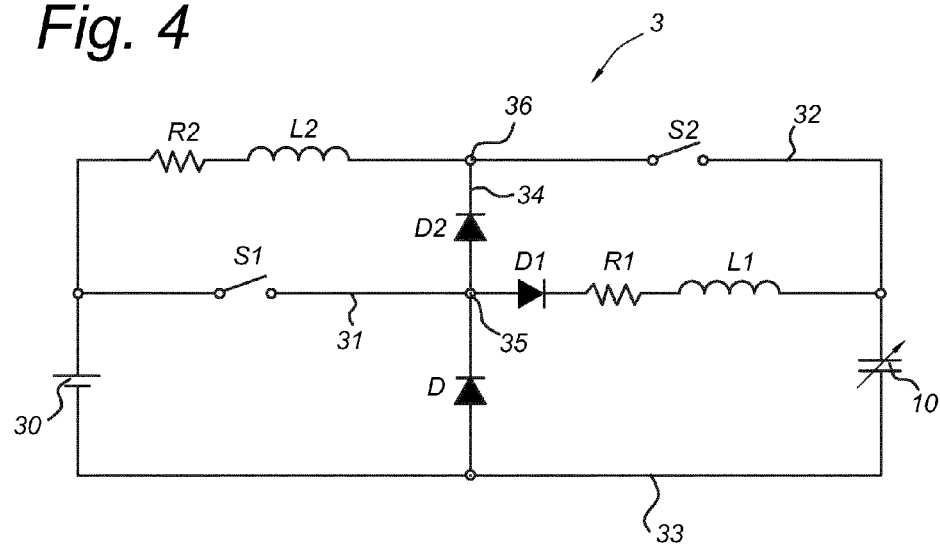
FIG. 4 shows schematically a topology of an electronic device according to an embodiment of the invention.

FIG. 4 shows schematically a topology of an electronic device 3 according to an embodiment of the invention.

In this embodiment, in comparison with the embodiment of the electronic device 1 shown in FIG. 2, two diodes are added.

A first control diode D1 is added in the charge line 31 between node 35 and the first inductor L1. A second control diode D2 is added in the connection line 34 between the first node 35 in the charge line 31 and the second node 36 in the discharge line 32.

In this embodiment, during discharge, when second switch S2 is closed, none of the control diodes D1, D2 will lead current. This affects conduction losses and switching losses in the electronic device and makes them lower.

Figure 5:
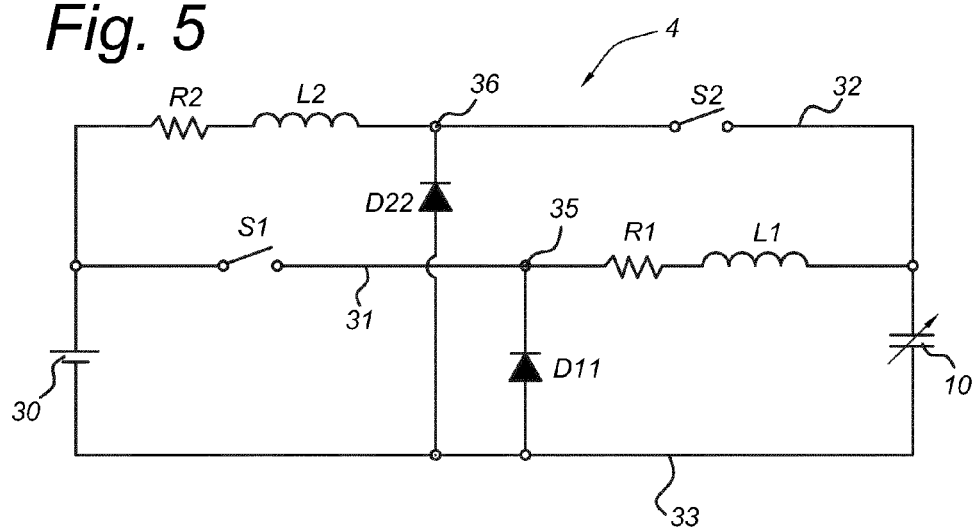
FIG. 5 shows schematically a topology of an electronic device according to an embodiment of the invention.

FIG. 5 shows schematically a topology of an electronic device 4 according to an embodiment of the invention.

The electronic device 4 comprises an arrangement of two buck converters L1, S1, D11, R1; L2, S2, D22, R2.

The positive terminal of the power source 30 is connected to the positive electrode of the variable capacitor 10 along a charge line 31 which in a series connects a first switch S1, and a first inductor L1 to the positive terminal of the variable capacitor 10. As described above, the first inductor L1 has an internal resistance schematically indicated by first resistor R1.

Further, the positive terminal of the power source 30 is connected to the positive electrode of the variable capacitor 10 along a discharge line 32 which in a series connects a second inductor L2 and a second switch S2 to the positive terminal of the variable capacitor 10. The second inductor L2 has an internal resistance schematically indicated by second resistor R2.

The charge line 31 is parallel to the discharge line 32.

Additionally, the negative terminal of the power source 30 is connected to the negative terminal of the variable capacitor 10 by a common line 33.

The common line 33 is connected to the charge line 31 by the diode D11 arranged between the common line 33 and the charge line 31 with the forward direction of the diode D11 towards the charge line 31. The diode D11 connects at node 35 on the charge line between the first switch and the first inductor L1.

Further, the common line 33 is connected to the discharge line 32 by the diode D22 arranged between the common line 33 and the discharge line 32 with the forward direction of the diode D22 towards the discharge line 32. The diode D22 connects at node 36 on the discharge line between the second switch S2 and the second inductor L2 wherein the second node is between the second switch S2 and the second inductor L2.

In the embodiment of FIG. 5, D11 will conduct only during the charge process when S1 is opened, and D22 will conduct only during the discharge process when S2 is opened. Conduction and switching losses are lower than in the embodiment shown in FIG. 4.

However in the embodiment of FIG. 5, the current of the variable capacitor 10 during the discharge period falls to zero every time when switch S2 is opened. As known to the skilled in the art, this leads to high current ripple, because it is necessary to maintain a given average value of discharging current. Higher ripple means higher effective value, thus higher losses.

Figure 6:
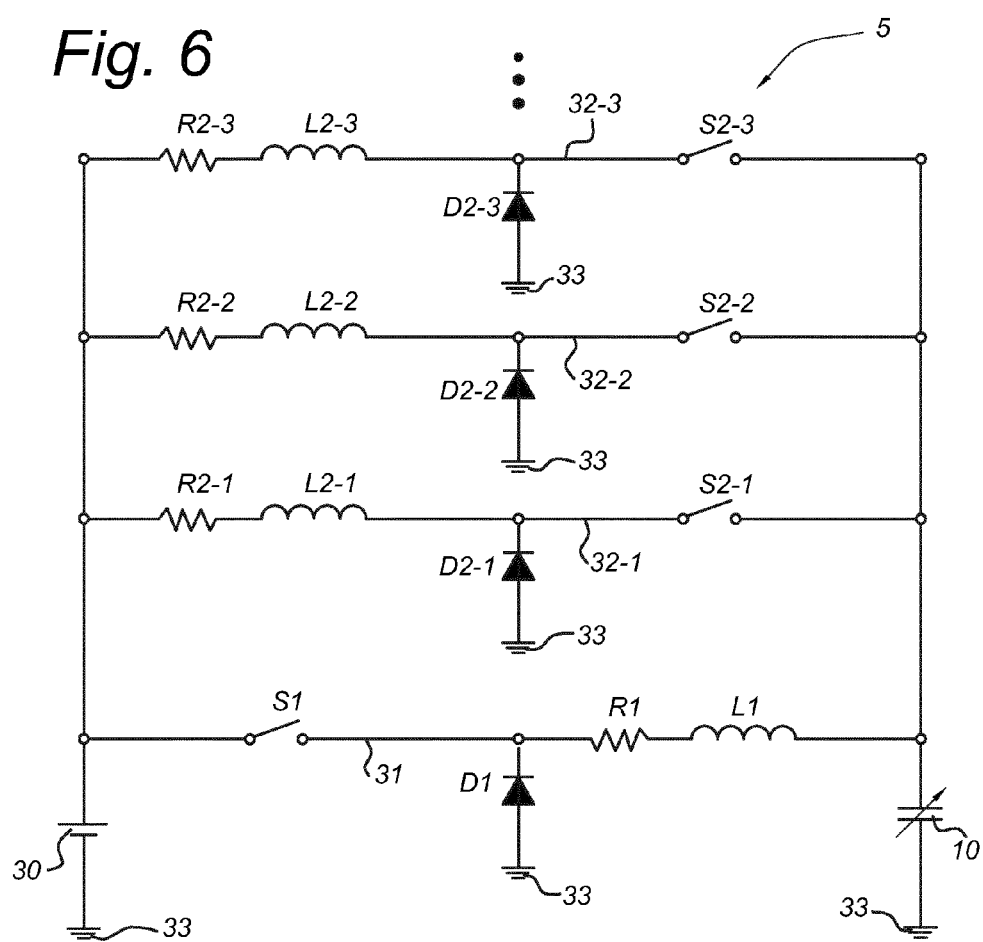
FIG. 6 shows schematically a topology of an electronic device according to an embodiment of the invention.

FIG. 6 shows schematically a topology of an electronic device 5 according to an embodiment of the invention.

In this embodiment, the electronic device 5 is arranged for preventing the current of the variable capacitor falling to zero during discharge by a plurality of discharge lines 32-1, 32-2, 32-3, . . . , in parallel to each other between the power source 30 and the variable capacitor 10, and additionally in parallel to the charge line 31 between the power source 30 and the variable capacitor 10.

The charge line 31 runs between the positive terminal of the power source 30 and the positive electrode of the variable capacitor 10 with the charge line 31 comprising in a series connection the first switch S1 and the first inductor L1. The first inductor is located adjacent to the positive terminal of the variable capacitor 10.

The charge line 31 is connected to ground level 33 by the first diode D1 that is connected to the charge line 31 between the first switch S1 and the first inductor L1, with the D1 diode's forward direction towards the charge line.

Further, each discharge line 32-1, 32-2, 32-3, . . . runs between the positive terminal of the power source 30 and the positive electrode of the variable capacitor 10. Each discharge line 32-1, 32-2, 32-3, . . . comprises in a series connection a respective second inductor L2-1, L2-2, L2-3, . . . , and respective second switch S2-1, S2-2, S2-3, . . . , with the respective second inductor adjacent to the positive terminal of the power source 30.

Each discharge line 32-1, 32-2, 32-3, . . . is connected to ground level 33 by the respective second diode D2-1, D2-2, D2-3 that is connected to the respective discharge line between the respective second switch S2-1, S2-2, S2-3 and the second inductor L2-1, L2-2, L2-3, . . . with the second diode's forward direction towards the discharge line.

The switching phase of each discharge line is chosen in such a way that each discharge period is shifted over a constant phase difference (for example 2 pi/N, N being the number of discharging sections) between adjacent discharge lines.

Figure 7:
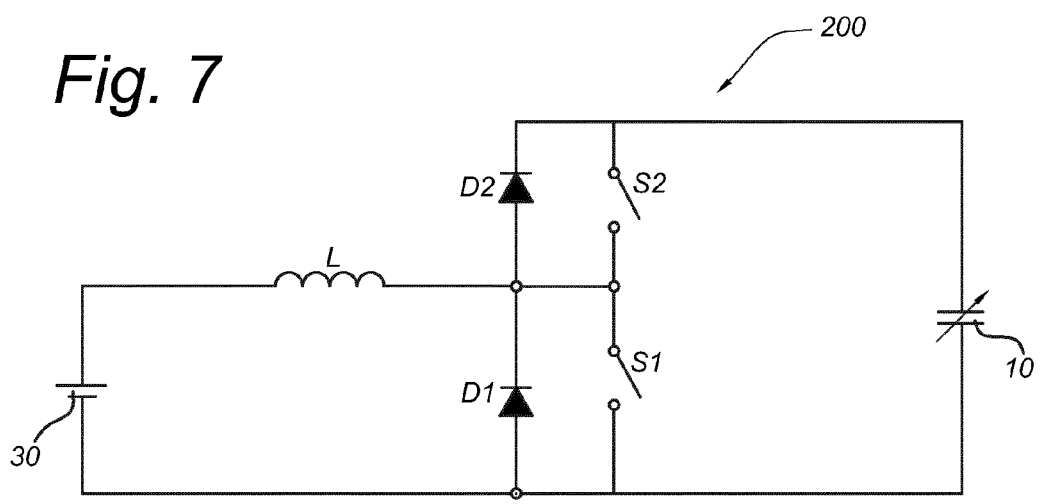
FIG. 7 shows schematically a topology of a prior art electronic device.

FIG. 7 shows schematically a topology of a prior art electronic device 200. The prior art electronic device 200 combines a boost converter and buck converter arrangement.

For the boost converter operation, switch S1 and diode D2 are used (FIG. 18), as well as common inductor L, battery Ubat and EAP capacitor 10. While working in this mode charges are put on the variable capacitor 10 until a maximum electric field is reached. During this period of charging the material, the average current must be constant because a constant field method is used. Now, as it is expected, current that flows through the variable capacitor 10 will have high ripple (current will fall to zero every time after switch S1 changes state to "on"). Because of high current ripple the effective value of current is high, and that causes high losses.

As for the buck converter operation, switch S2 and diode D1 are used, as well as other common necessary components as described above. In this mode, first the variable capacitor 10 is discharged to keep a constant electric field. After that period the variable capacitor 10 is discharged with a constant average value of current until only a given amount of residual charge is left on the variable capacitor 10. During the discharging period as well as during the charging period, current will have a high current ripple. The current will fall to zero every time after switch S2 is opened. Again, this causes high losses.

It will be appreciated that the main difference between the electronic device 1, 2, 3, 4, 5 according to the invention and the prior art electronic device 200 occurs during the charging period. For the electronic device according to the invention charging current is continuous in this period, while for the prior art boost converter-buck converter electronic device 200 the charging current is discontinuous. The current ripple is much lower for the electronic device according to present invention as are the losses. This provides an advantage over the prior art Boost converter-Buck converter device topology of the prior art electronic device 200.

Another advantage of the electronic device according to the present invention over the prior art boost-buck electronic device topology 200 is a lower rated blocking voltage over one switch. In the prior art electronic device 200 both switches S1, S2 must be rated for the maximum voltage that can appear over the variable capacitor 10. In the electronic device according to the present invention the first switch (S1) which will change its state during charging has to block only the voltage of the input (i.e. the power source voltage) or the difference between the power source voltage and the output i.e., the variable capacitor voltage (depending on ratio between input and output).

The electronic device according to the present invention allows to use optimal residual charge left on the variable capacitor 10, which leads to higher energy gain. In the prior art electronic device 200 the amount of residual charge on the variable capacitor is defined by the deformation level of the variable capacitor and the power source voltage, so that even when voltage on the variable capacitor is minimal, it must be higher than the power source voltage (else it will cause a current flow from the power source to the variable capacitor, and thus disturb the energy harvesting method). If the optimal residual charge is lower than the charge defined with the deformation (stretch) and the power source voltage Ubat, it will create a lower voltage on the variable capacitor at same moment and for same deformation or stretch ratio. From FIG. 7 it can be seen that the diode D2 provides an open path for current from the power source to the variable capacitor, if there is enough electric potential difference. This means that after discharging, if the residual charge is optimal and the variable capacitor voltage is decreasing (because of the capacitance of the variable capacitor rising), undesirable charging of the variable capacitor can occur before the optimal moment as defined in the harvesting cycle. Advantageously, in the electronic device according to the present invention there is no free path for current to flow like in the prior art electronic device.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims.

The invention claimed is:

1. An electronic device for charging and discharging a capacitor from and to a power source, the electronic device connectable to the capacitor and to the power source, and comprising a first circuit for charging the capacitor and at least one second circuit for discharging the capacitor; the capacitor being connected to the first circuit in a charge line and being connected to the second circuit in a discharge line, both the charge line and discharge line connectable to the power source,
   wherein the first circuit is arranged as a first buck converter circuit and the at least one second circuit is arranged as a second buck converter circuit, and
   wherein the first buck converter circuit comprises a first switch, a first inductor and a first diode, the second buck converter circuit comprises a second switch, a second inductor and a second diode;
   a positive terminal of the power source is connectable to a positive electrode of the capacitor along the charge line which in a series connects the first switch and the first inductor of the first buck converter circuit to the positive terminal of the capacitor with the first inductor arranged adjacent the positive electrode of the capacitor;
   the positive terminal of the power source is connectable to the positive electrode of the capacitor along the discharge line which in a series connects the second switch and the second inductor of the second buck converter circuit to the positive terminal of the capacitor with the second inductor arranged adjacent the positive terminal of the power source, the voltage of the power source being rated between a minimal and maximal voltage of the capacitor as obtainable during use.

2. The electronic device according to claim 1, further comprising a common level conductor to which the negative terminal of the power source and the negative electrode of the capacitor are connectable.

3. The electronic device according to claim 2, wherein the first and second diode are embodied as a common diode, the common diode being connected between a first node of the charge line and the common level conductor; the first node of the charge line being between the first switch and the first inductor.

4. The electronic device according to claim 3, wherein the first node of the charge line is connected to a second node of the discharge line between the second switch and the second inductor.

5. The electronic device according to claim 2, wherein the common level conductor is a ground level connector.

6. The electronic device according to claim 1, wherein,
   the charge line comprises a first control diode between the first node and the first inductor, the first control diode having a forward direction towards the first inductor, and
   the discharge line comprises a second control diode between the second node and the second inductor, the second control diode having a forward direction towards the second inductor.

7. The electronic device according to claim 1, wherein,
   the first diode of the first buck converter is connected between a first node of the charge line and the common level conductor; the first node of the charge line being between the first switch and the first inductor; the first diode having a forward direction towards the charge line, and
   the second diode of the second buck converter is connected between a second node of the discharge line and the common level conductor; the second node of the discharge line being between the second switch and the second inductor; the second diode having a forward direction towards the discharge line.

8. The electronic device according to claim 1,
   wherein the electronic device comprises the first buck converter circuits and a plurality of the second buck converter circuits;
   wherein the first buck converter circuit is arranged in a charge line connectable between a positive terminal of the power source and a positive electrode of the capacitor and each of the plurality of second buck converter circuits is arranged in a respective discharge line connectable between a positive terminal of the power source and a positive electrode of the capacitor, and wherein a discharge period for each pair of the plurality of the second buck converter circuits in adjacent discharge lines is shifted over a constant phase difference, the voltage of the power source being rated between a minimal and maximal voltage of the capacitor as obtainable during use.

9. The electronic device according to claim 8, wherein, each of the plurality of second buck converter circuits comprises a respective one of the second switch, a respective one of the second inductor and a respective one of the second diode;

each discharge line in a series connecting the respective second switch and the respective second inductor of the respective second buck converter circuit from the plurality of second buck converter circuits to the positive terminal of the capacitor with the respective second inductor arranged adjacent the positive terminal of the power source, and the first diode of the first buck converter being connected between a first node of the charge line and the common level conductor, the first node of the charge line being between the first switch and the first inductor; the first diode having a forward direction towards the charge line, and the respective second diode of each second buck converter being connected between a second node of the respective discharge line and the common level conductor; the second node of the respective discharge line being between the second switch and the second inductor of the respective second buck converter circuit; the respective second diode having a forward direction towards the discharge line.

10. The electronic device according to claim 1, wherein the capacitor is a variable capacitor.

11. An electromechanical energy conversion system comprising:

a variable capacitor,
an electronic device, and
a power source;
the power source being coupled to the electronic device;
the electronic device being coupled to the variable capacitor;
the variable capacitor comprising first and second electrodes that are separated by an intermediate medium providing a gap distance between the first and second electrodes;

the gap distance of the variable capacitor being adjustable between a minimal distance and a maximal distance as a function of an externally applied mechanical force;

the electronic device unit being arranged for charging the variable capacitor from the power source at substantially a state of the variable capacitor when the gap distance is minimal and for discharging the variable capacitor to the power source at substantially a state of the variable capacitor when the gap distance is maximal and/or the area of the variable capacitor is maximal, wherein the electronic device comprises a first circuit for charging the capacitor and at least one second circuit for discharging the capacitor;

the capacitor being connected to the first circuit in a charge line in-between the power source and the variable capacitor and being connected to the at least one second circuit in a discharge line in-between the variable capacitor and the power source, wherein the first circuit is arranged as a first buck converter circuit and the at least one second circuit is arranged as a second buck converter circuit, wherein the first buck converter circuit comprises a first switch, a first inductor and a first diode, the second buck converter circuit comprises a second switch, a second inductor and a second diode, wherein a positive terminal of the power source is connectable to a positive electrode of the capacitor along the charge line which in a series connects the first switch and the first inductor of the first buck converter circuit to the positive terminal of the capacitor with the first inductor arranged adjacent the positive electrode of the capacitor, wherein the positive terminal of the power source is connectable to the positive electrode of the capacitor along the discharge line which in a series connects the second switch and the second inductor of the second buck converter circuit to the positive terminal of the capacitor with the second inductor arranged adjacent the positive terminal of the power source, and wherein the voltage of the power source is rated between a minimal and maximal voltage of the capacitor as obtainable during use.

12. A method for electromechanical energy conversion using an electromechanical system according to claim 11, comprising the step of selecting a DC voltage of the power source between a minimal and a maximal voltage of the capacitor as obtainable during use.

* * * * *